United States Patent
Yang et al.

(10) Patent No.: US 9,724,871 B2
(45) Date of Patent: Aug. 8, 2017

(54) FILM ADHERING APPARATUS

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: De-Qiang Yang, Jiashan (CN); Yang-Chun Wu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 377 days.

(21) Appl. No.: 14/491,115

(22) Filed: Sep. 19, 2014

(65) Prior Publication Data
US 2015/0083334 A1    Mar. 26, 2015

(30) Foreign Application Priority Data
Sep. 26, 2013 (CN) ............. 2013 2 0595361 U

(51) Int. Cl.
| | |
|---|---|
| *B29C 63/02* | (2006.01) |
| *B65B 61/22* | (2006.01) |
| *B65B 67/10* | (2006.01) |
| *B65B 57/10* | (2006.01) |

(52) U.S. Cl.
CPC .............. *B29C 63/02* (2013.01); *B65B 57/10* (2013.01); *B65B 61/22* (2013.01)

(58) Field of Classification Search
CPC ......... B29C 61/22; B29C 63/02; B29C 67/10; Y10T 156/13
See application file for complete search history.

(56) References Cited

U.S. PATENT DOCUMENTS

| | | | |
|---|---|---|---|
| 6,699,346 B1 * | 3/2004 | Habisreitinger | ........ B29C 63/02 156/212 |
| 2014/0020332 A1 * | 1/2014 | Lu | ......................... B65B 11/025 53/203 |

* cited by examiner

*Primary Examiner* — Mark A Osele
*Assistant Examiner* — Christopher C Caillouet
(74) *Attorney, Agent, or Firm* — Steven Reiss

(57) ABSTRACT

A film adhering apparatus for adhering a protective film on a work piece includes a controller, a conveyor belt, a rotating bracket configured to assemble the protective film, a suction driving member, a sensor, a first suction member, a cutting assembly, and a moving assembly. When the work piece is sensed by the sensor, one end of the protective film is pulled by the moving assembly to pass by the first suction member, and the protective film is sucked by the first suction member. The moving assembly releases the protective film and reset to suck the protective film again, and the protective film is cut off by the cutting assembly. The suction driving member drives the first suction member to move toward the work piece and the protective film is adhered on the work piece.

12 Claims, 4 Drawing Sheets

FILM ADHERING APPARATUS

FIELD

The present disclosure generally relates to adhering apparatuses, and particularly to an adhering apparatus for adhering a protective film to a work piece.

BACKGROUND

Surfaces of devices or components may include a protective film for protecting them. The protective film is typically affixed to the device or the component manually.

BRIEF DESCRIPTION OF THE DRAWINGS

Implementations of the present technology will now be described, by way of example only, with reference to the attached figures.

DETAILED DESCRIPTION

Figure 1:
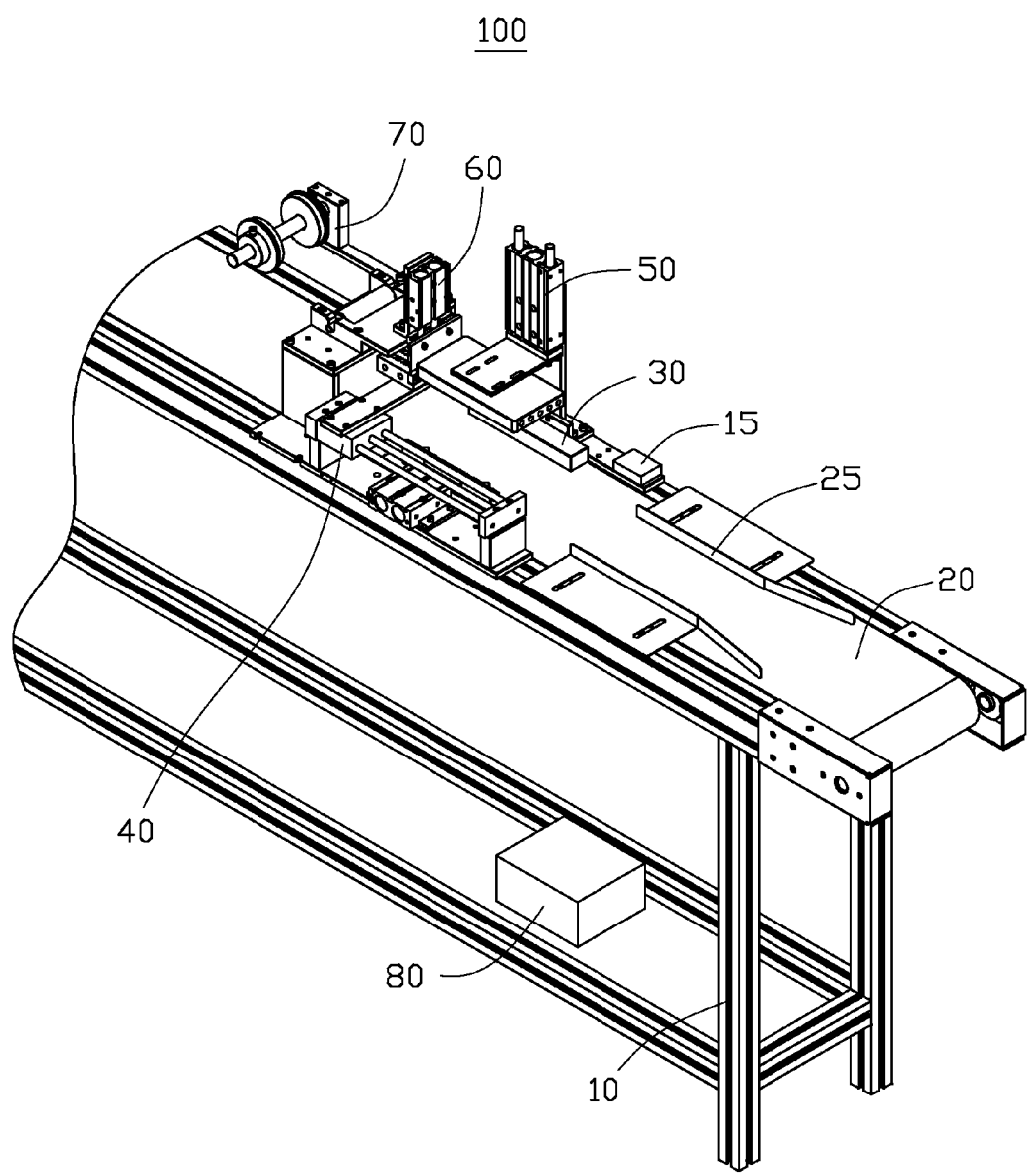
FIG. 1 is an isometric view of an embodiment of a film adhering apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a film adhering apparatus for adhering a film to a work piece.

FIG. 1 illustrates a film adhering apparatus 100 including a stand 10, a sensor 15, a conveyor belt 20, a pair of guiding members 25, a positioning member 30, a moving assembly 40, a suction assembly 50, a cutting assembly 60, a transmission member 70, and a controller 80. The conveyor belt 20, the sensor 15, the guiding members 25, the positioning member 30, the moving assembly 40, and the suction assembly 50 can be mounted on the stand 10. The controller can be electrically connected to the sensor 15, the suction assembly 50, the cutting assembly 60 and moving assembly 40.

The sensor 15 can be mounted on the stand 10 near the conveyor belt 20. The guiding members 25, the positioning member 30, and the moving assembly 40 can be partially positioned above the conveyor belt 20. The suction assembly 50 can be positioned opposite to the moving assembly 40. The transmission member 70 can be positioned near the cutting assembly 60.

Figure 2:
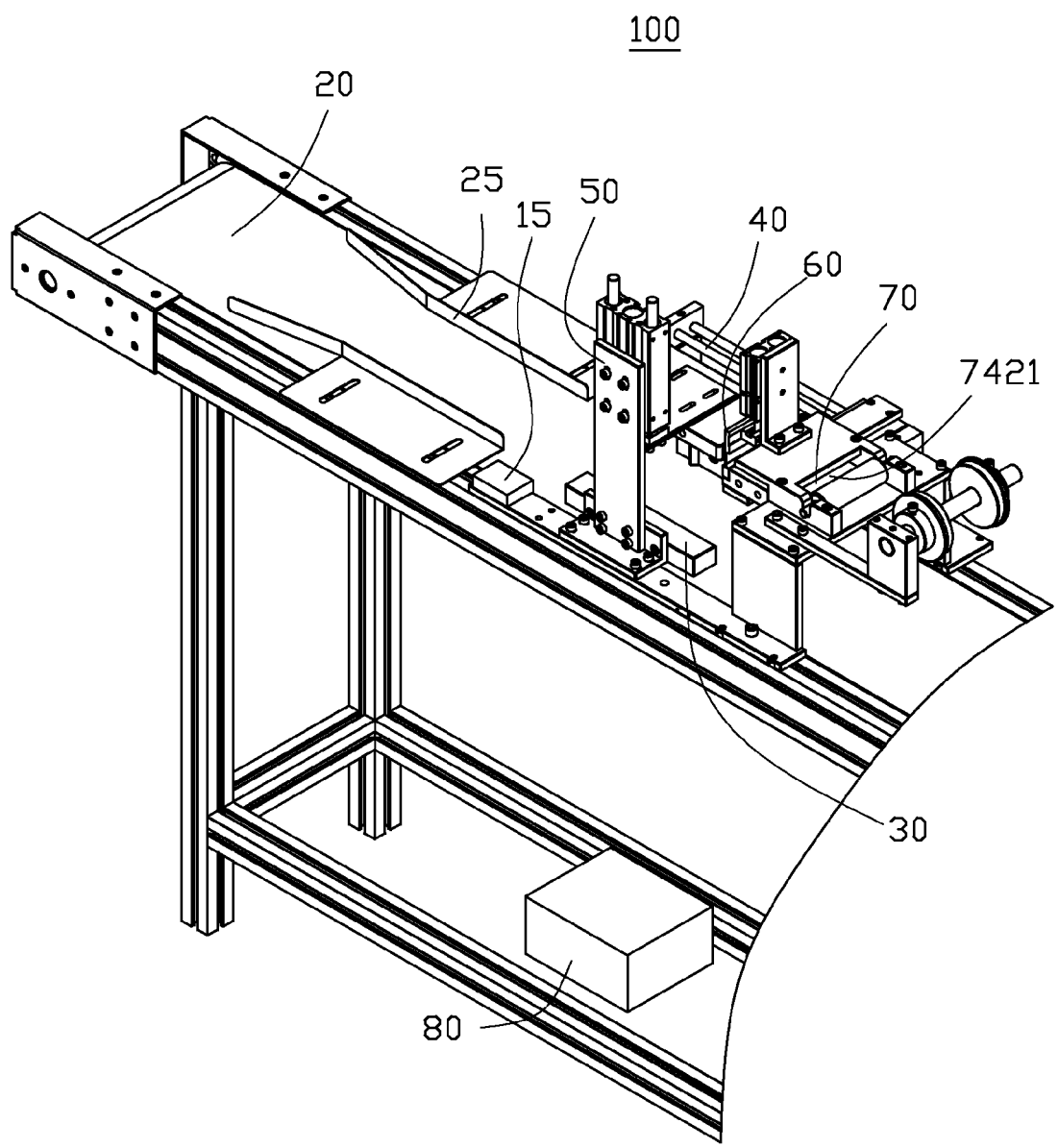
FIG. 2 is an isometric view of the film adhering apparatus of FIG. 1 from another angle.

FIG. 2 illustrates the transmission member 70 can define a guide hole 7421 for the film to get through.

Figure 3:
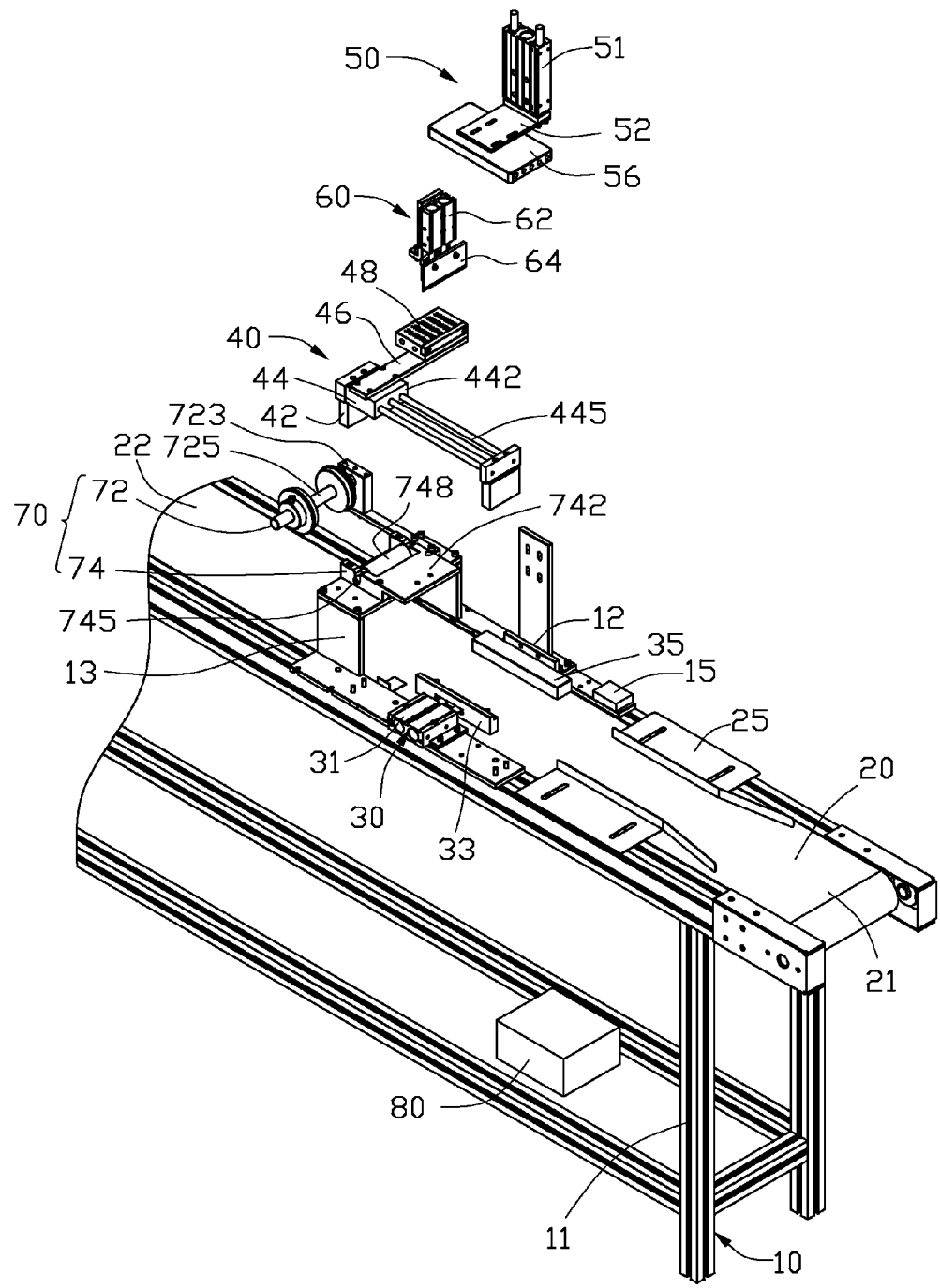
FIG. 3 is an exploded, isometric view of the film adhering apparatus of FIG. 1.

FIG. 3 illustrates that the stand 10 can include a bracket 11, a first fixing portion 12, and a second fixing portion 13. The first fixing portion 12 can be a substantially strip-shaped plate and positioned at one side of the bracket 11. The second fixing portion 13 can be substantially portal shaped. The second fixing portion 13 can be positioned on top of the conveyor belt 20 and distanced from the first fixing portion 12.

The conveyor belt 20 can be positioned on the bracket 11 and configured to move work pieces 300 (shown in FIG. 4) from an inlet end 21 to an outlet end 22 along a moving path. The moving path of the conveyor belt 20 can be along a longitude direction of the bracket 11.

The guiding members 25 can be mounted on the bracket 11 and positioned at two opposite sides of the conveyor belt 20 near the inlet end 21. Each guiding member 25 can be partially positioned above the transfer belt 20. The guiding members 25 can be strip-shaped and configured to guide the work pieces 300 to move along the moving direction of the conveyor belt 20.

The positioning member 30 can be mounted on the bracket 11 and include a first driving member 31, a first positioning plate 33, and a second positioning plate 35. The first driving member 31 can be mounted at one side of the bracket 11 near the conveyor belt 20 and coupled to the controller. The first positioning plate 33 can be mounted on a driving end of the first driving member 31. The second positioning plate 35 can be mounted on the first fixing portion 12 and near the guiding member 25. The first positioning plate 33 and the second positioning plate 35 can be positioned at two opposite sides of the conveyor belt 20, and the first driving member 31 can drive the first positioning plate 33 to move toward the second positioning plate 35, thus the work piece 300 can be clamped by the two positioning plates. In at least one embodiment, the first driving member 31 can be an air cylinder.

The sensor 15 can be positioned between the second positioning plate 35 and the guiding member 25, and electrically connected to the controller. The sensor 15 can be configured to sense if the work piece 300 has passed by the second positioning plate 35 and transmit corresponding signal to the controller 80.

The suction assembly 50 can be mounted on the first fixing portion 12 and include a suction driving member 51, a connecting plate 52, and a first suction member 56. The suction driving member 51 can be mounted on one end of the first fixing portion 12 away from the bracket 11. The connecting plate 52 can be substantially plate shaped and connect the suction driving member 51 and the first suction member 56. The connecting plate 52 can be mounted on a driving end of the suction driving member 51 and positioned above the conveyor belt 20. The first suction member 56 can be mounted on the connecting plate 52 and parallel to the conveyor belt 20. The first suction member 56 can be coupled to an external gas source (not shown) and define a plurality of suction holes (not shown) on a surface toward the conveyor belt 20. In at least one embodiment, the suction driving member 51 can be an air cylinder.

The moving assembly 40 can be mounted at one side of the bracket 11 and near the conveyor belt 20. The moving assembly 40 can include two supporting members 42, a moving member 44, a connecting member 46, and a second suction member 48. The two supporting members 42 can be mounted at two sides of the first driving member 31, and one supporting member 42 can be positioned adjacent to the guiding member 25. The moving member 44 can include a second driving member 442 and a plurality of guide rails 445. Two ends of the guide rails 445 can be mounted on the two supporting members 42, and the guide rails 445 can be parallel and distanced from each other. The second driving member 442 can be slidably mounted on the guide rails 445. The connecting member 46 can be a substantially strip-shaped plate positioned above the conveyor belt 20. The connecting member 46 can be mounted on the second driving member 442 and adjacent to the second fixing portion 13. The second suction member 48 can mounted on the connecting member 46 and parallel to the conveyor belt 20, and positioned under the first suction member 56. The second suction member 48 can be coupled to the external gas source, and define a plurality of suction holes (not shown) on a surface away from the connecting member 46. In at least one embodiment, the second driving member 442 can be an air cylinder. In other embodiments, the guide rails 445 can be one, two, or more.

The transmission member 70 can be mounted on one end of the second fixing portion 13 away from the bracket 11. The transmission member 70 can include a rotating bracket 72 and a pressing member 74. The rotating bracket 72 can include a fixing plate 723 and a first transmission shaft 725, and configured to dispense the work piece 300. The fixing plate 723 can be fixed on the second fixing portion 13. The pressing member 74 can include a fixing base 742, a second transmission shaft 745, and a pressing roller 748 slidably sleeved on the second transmission shaft 745. The fixing base 742 can be fixed on the second fixing portion 13 and adjacent to the second suction member 48. The guide hole 7421 (shown in FIG. 2) can be defined in the fixing base 742, and an end of the guide hole 7421 can be substantially flush with the second suction member 48. The fixing base 742 and the fixing plate 723 can protrude from two opposite sides of the second fixing portion 13.

The cutting assembly 60 can be mounted on one end of the fixing base 742 away from the second fixing portion 13. The cutting assembly 60 can include a third driving member 62 and a cutter 64 mounted on a driving end of the third driving member 62. An edge of the cutter 64 can be toward the conveyor belt 20.

Figure 4:
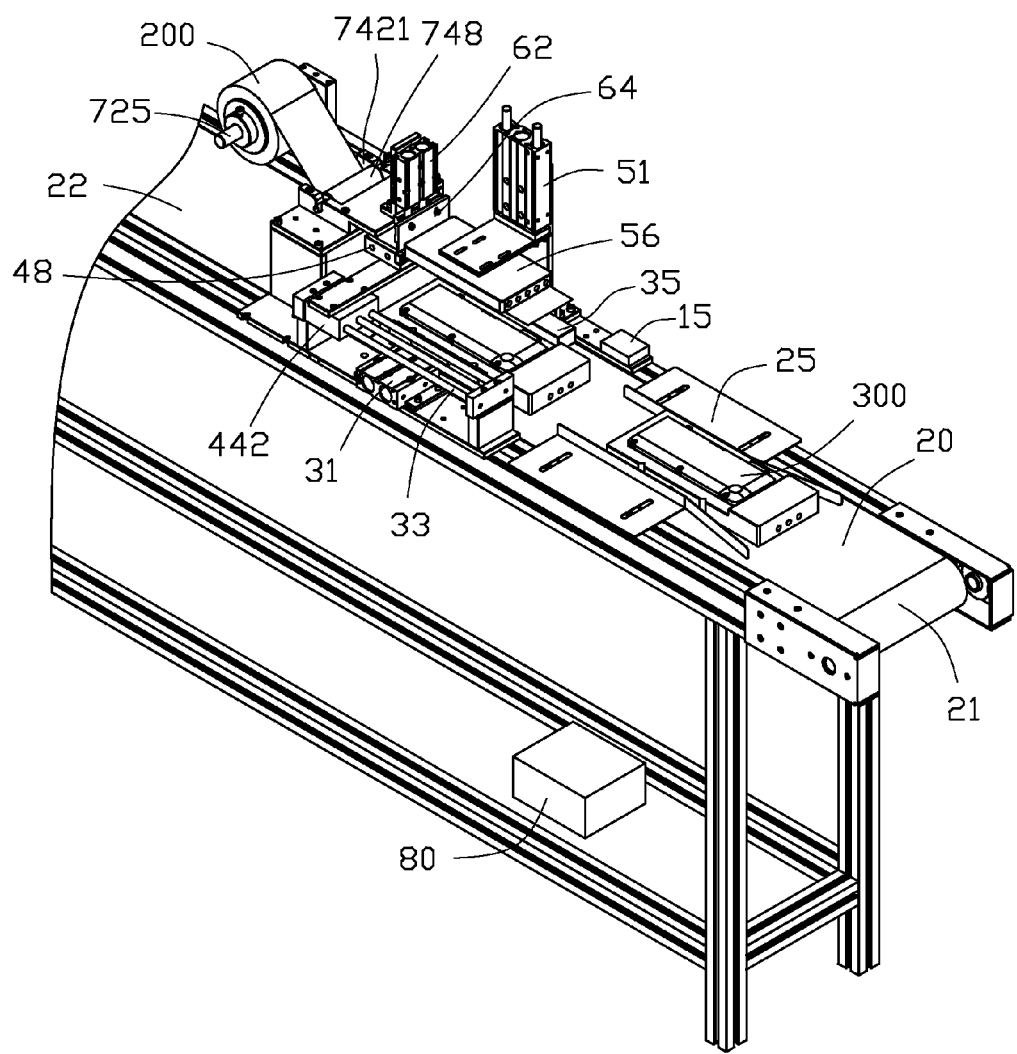
FIG. 4 is an isometric view of the film adhering apparatus of FIG. 1 in operation.

FIG. 4 illustrates that a protective film 200 can be mounted on the first transmission shaft 725 and can rotate around the first transmission shaft 725. The work piece 300 can be transferred by the conveyor belt 20.

In a process of pulling the protective film 200, one end of the protective film 200 can be pulled by manual to pass through the guide hole 7421 and the pressing roller 748, and then positioned on the second suction member 48. The external gas source can be started, and the protective film 200 can be adhered on the second suction member 48 by suction. Then, the work piece 300 can be transferred from the inlet end 21, guided by the guiding member 25, and transferred by the conveyor belt 20. When the work piece 300 reaches to the second positioning plate 35, the sensor 15 can send signals to the controller 80, and the first driving member 31 can be controlled by the controller 80 to drive the first positioning plate 33 to move toward the second positioning plate 35, and the work piece 300 can be clamped between the first positioning plate 33 and the second positioning plate 35. The conveyor belt 20 can then stop moving.

After that, the second driving member 442 can drive the second suction member 48 to move along the moving path of the conveyor belt 20. When the protective film 200 sucked by the second suction member 48 is positioned right above the work piece 300 and in contact with the first suction member 56, the second driving member 442 can stop moving. At last, the gas source can be started, and the protective film 200 can be sucked by the first suction member 56.

In a process of adhering the protective film 200, the external gas source can be cut off, and the protective film 200 can be separated from the second suction member 48. The second driving member 442 can drive the second suction member 48 to move away from the first suction member 56. Then, the cutter 64 can move toward the work piece 300 driven by the third driving member 62 and cut off the work piece 300. The suction driving member 51 can drive the first driving member 56 to move toward the work piece 300. When the protective film 200 is contact with the work piece 300, the protective film 200 can be flow down by the first suction member 56 and cover on the work piece 300. After that, the first suction member 56 can move away from the work piece 300 and reset driven by the suction driving member 51. The gas source can be started and the protective film 200 can be sucked by the first suction member 56. The first driving member 31 can drive the first positioning plate 33 to move away from the work piece 300, and the work piece 300 can be transferred to a next station by the conveyor belt 20.

In other embodiments, the guiding member 25 can be omitted, and the sensor 15 can be positioned near the first fixing portion 12. The connecting member 46 and the connecting plate 52 can be omitted. The second suction member 48 can be directly mounted on the moving member 44, and the first suction member 56 can be directly mounted on the suction driving member 51. The rotating bracket 72 can be omitted, and the cutting assembly 60 can be mounted on the second fixing portion 13.

In other embodiments, the positioning member 30 can be omitted, and the controller 80 can control the conveyor belt 20 to stop moving when the sensor 15 sensed that the work piece 300 is positioned below the first suction member 56. The supporting member 42 can be omitted, and the moving member 44 can be mounted on the stand 10.

The film adhering apparatus 100 of this disclosure can include the moving assembly 40, the suction assembly 50, and the cutting assembly 60, and the protective film 200 can be automatically cut off and adhered on the work piece 300. Therefore, the film adhering apparatus 100 can save cost and time, and an efficiency of adhering the film can be increased.

The embodiments shown and described above are only examples. Many details are often found in the art such as the other features of a lathe and a film adhering apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims

What is claimed is:

1. An apparatus for adhering a protective film on a work piece, comprising:
    a controller;
    a conveyor belt configured to move a work piece from an inlet end to an outlet end along a moving path;
    a rotating bracket positioned above the moving conveyor belt path between the inlet end and the outlet end, the rotating bracket configured to dispense the protective film;
    a suction driving member positioned on a first side of the conveyor belt and having a first suction member;
    a first suction member mounted on the suction driving member, and a surface of the first suction member being parallel to a surface of the conveyor belt;
    a sensor positioned along the conveyor belt between the conveyor belt inlet end and the suction driving member;
    a cutting assembly mounted over the conveyor belt moving path and positioned adjacent the suction driving member between the suction driving member and the conveyor belt outlet end; and
    a moving assembly positioned along the conveyor belt moving path between the suction driving member and the cutting assembly;
        wherein, the controller is electrically connected to the sensor and the rotating bracket, the suction driving member, the cutting assembly and the moving assembly;
        wherein, when moving along the conveyor belt from the conveyor belt inlet end to the conveyor belt outlet end, the work piece is sensed by the sensor and one end of the protective film is moved by the moving assembly to the first suction member and the first suction member exerts suction on the film; and
        wherein, the cutting assembly cuts the protective film and the suction driving member drives the first suction member toward the work piece to adhere the protective film on the work piece.

2. The film adhering apparatus as claimed in claim 1, further comprising:
    a positioning member including a first driving member, a first positioning plate, and a second positioning plate;
    the first driving member and the second positioning plate are mounted at two sides of the conveyor belt;
    the first positioning plate is mounted on the first driving member and opposite to the second positioning plate;
    the first driving member is configured to drive the first positioning plate move toward the second positioning plate to clamp the work piece when the sensor sensed the work piece.

3. The film adhering apparatus as claimed in claim 2, wherein the moving assembly comprises two supporting members mounted at two sides of the first driving member, a moving member mounted on the two supporting members, and a second suction member mounted on the moving member and parallel to the conveyor belt.

4. The film adhering apparatus as claimed in claim 3, wherein the second suction member is positioned below the first suction member, and the cutting assembly is mounted near the first suction member.

5. The film adhering apparatus as claimed in claim 3, wherein the moving member comprises a second driving member and a guide rail mounted on the two supporting members; the second driving member is slidably mounted on the guide rail, and the second suction member is mounted on the second driving member.

6. The film adhering apparatus as claimed in claim 1, further comprising:
    a pair of guiding members;
    the guiding members are mounted on two sides of the conveyor belt, and one of the guiding member is positioned between the sensor and the inlet end.

7. The film adhering apparatus as claimed in claim 1, wherein the cutting assembly comprises a cutter driving member and a cutter coupled to the cutter driving member, and an edge of the cutter is positioned toward the conveyor belt.

8. The film adhering apparatus as claimed in claim 1, further comprising a stand; the conveyor belt, the rotating bracket, the suction driving member, the cutting assembly, and the moving assembly are mounted on the stand.

9. The film adhering apparatus as claimed in claim 8, wherein the stand comprises a bracket, a first fixing portion, and a second fixing portion; the first fixing portion and the second fixing portion are mounted on the bracket and distanced from each other.

10. The film adhering apparatus as claimed in claim 9, wherein the conveyor belt is mounted on the bracket, the suction driving member is mounted on the first fixing portion, and the rotating bracket and the cutting assembly are mounted on two sides of the second fixing portion.

11. The film adhering apparatus as claimed in claim 9, wherein,
    the film adhering apparatus further comprises a pressing member;
    the rotating bracket comprises a fixing plate and a first transmission shaft mounted on the fixing plate;
    the pressing member comprises a fixing base, a second transmission shaft, and a pressing roller slidably sleeved on the second transmission shaft.

12. The film adhering apparatus as claimed in claim 11, wherein,
    the fixing plate and the fixing base are mounted on the second fixing portion at interval and protrude out of two sides of the second fixing portion;
    the cutting assembly is mounted on the fixing base.

* * * * *